US012491200B2

(12) United States Patent
Mukunda et al.

(10) Patent No.: US 12,491,200 B2
(45) Date of Patent: Dec. 9, 2025

(54) COMPOSITIONS AND METHODS USING CANNABINOIDS FOR TREATING STAMMERING/STUTTERING AND SYMPTOMS OF TOURETTE SYNDROME

(71) Applicant: IGC Pharma IP, LLC, Potomac, MD (US)

(72) Inventors: Ramachandra Mukunda, Potomac, MD (US); Jagadeesh Sridhara Rao, Ashburn, VA (US); Amar R. Mukunda, Bethesda, MD (US)

(73) Assignee: IGC Pharma IP, LLC, Potomac, MD (US)

( * ) Notice: Subject to any disclaimer, the term of this patent is extended or adjusted under 35 U.S.C. 154(b) by 661 days.

(21) Appl. No.: 17/613,909

(22) PCT Filed: May 26, 2020

(86) PCT No.: PCT/US2020/034602
§ 371 (c)(1),
(2) Date: Nov. 23, 2021

(87) PCT Pub. No.: WO2020/237247
PCT Pub. Date: Nov. 26, 2020

(65) Prior Publication Data
US 2022/0257560 A1 Aug. 18, 2022

Related U.S. Application Data

(60) Provisional application No. 62/852,257, filed on May 23, 2019.

(51) Int. Cl.
| | | |
|---|---|---|
| *A61P 25/18* | (2006.01) | |
| *A61K 9/00* | (2006.01) | |
| *A61K 31/00* | (2006.01) | |
| *A61K 31/166* | (2006.01) | |
| *A61K 31/40* | (2006.01) | |
| *A61K 31/495* | (2006.01) | |
| *A61K 31/496* | (2006.01) | |
| *A61K 31/519* | (2006.01) | |
| *A61K 31/5513* | (2006.01) | |
| *A61K 47/22* | (2006.01) | |
| *A61K 47/26* | (2006.01) | |
| *A61K 47/44* | (2017.01) | |
| *A61K 47/46* | (2006.01) | |

(52) U.S. Cl.
CPC .......... *A61K 31/658* (2023.05); *A61K 9/0053* (2013.01); *A61K 31/166* (2013.01); *A61K 31/40* (2013.01); *A61K 31/495* (2013.01); *A61K 31/496* (2013.01); *A61K 31/519* (2013.01); *A61K 31/5513* (2013.01); *A61K 47/22* (2013.01); *A61K 47/26* (2013.01); *A61K 47/44* (2013.01); *A61K 47/46* (2013.01); *A61P 25/18* (2018.01)

(58) Field of Classification Search
CPC .................................................... A61K 31/658
See application file for complete search history.

(56) References Cited

U.S. PATENT DOCUMENTS

| | | |
|---|---|---|
| 10,117,891 B2 | 11/2018 | Mukunda et al. |
| 10,596,159 B2 | 3/2020 | Mukunda et al. |
| 10,722,545 B2 | 7/2020 | Kariman |
| 10,751,300 B2 | 8/2020 | Mukunda et al. |
| 10,933,082 B2 | 3/2021 | Mukunda et al. |
| 11,065,225 B1 | 7/2021 | Cao |
| 11,197,845 B2 | 12/2021 | Brener et al. |
| 2016/0000815 A1 | 1/2016 | Bird |
| 2016/0271141 A1 | 9/2016 | Chipkin |
| 2017/0027978 A1 | 2/2017 | Mukunda et al. |
| 2017/0348276 A1* | 12/2017 | Bryson ............... A61P 25/04 |
| 2018/0064055 A1 | 3/2018 | Lewis et al. |
| 2018/0078523 A1 | 3/2018 | Shmulewitz et al. |
| 2018/0161285 A1 | 6/2018 | Mukunda et al. |
| 2018/0228788 A1 | 8/2018 | Mukunda et al. |
| 2019/0030062 A1 | 1/2019 | Mukunda et al. |
| 2019/0201463 A1 | 7/2019 | Kariman |
| 2020/0046722 A1 | 2/2020 | Mukunda |
| 2020/0179342 A1 | 6/2020 | Mukunda et al. |
| 2020/0383935 A1 | 12/2020 | Mukunda et al. |
| 2021/0023053 A1 | 1/2021 | Mukunda et al. |
| 2021/0353705 A1 | 11/2021 | Mukunda et al. |
| 2022/0241244 A1 | 8/2022 | Mukunda et al. |
| 2022/0257560 A1 | 8/2022 | Mukunda et al. |

(Continued)

FOREIGN PATENT DOCUMENTS

| | | |
|---|---|---|
| WO | 2016/044370 A1 | 3/2016 |
| WO | 2016/118391 A1 | 7/2016 |
| WO | 2016/160542 A1 | 10/2016 |

(Continued)

OTHER PUBLICATIONS

Artukoglu BB, Bloch MH. The Potential of Cannabinoid-Based Treatments in Tourette Syndrome. CNS Drugs. May 2019;33(5):417-430. PMID: 30977108. (Year: 2019).*

Jakubovski E, Müller-Vahl K. Speechlessness in Gilles de la Tourette Syndrome: Cannabis-Based Medicines Improve Severe Vocal Blocking Tics in Two Patients. Int J Mol Sci. Aug. 10, 2017;18(8):1739. PMID: 28796166. (Year: 2017).*

Budman, "The role of atypical antipsychotics for treatment of Tourette's syndrome: an overview," Drugs 2014;74(11):1177-93. PMID: 25034359. (Year: 2014).*

(Continued)

*Primary Examiner* — Theodore R. Howell
(74) *Attorney, Agent, or Firm* — Studebaker Brackett PLLC

(57) ABSTRACT

This invention relates to compositions and methods for treating stammering/stuttering and Tourette syndrome (TS) in humans, using a formulation comprising of a combination of a *Cannabis* compound, or compounds.

20 Claims, No Drawings

(56) References Cited

U.S. PATENT DOCUMENTS

2022/0265598 A1    8/2022   Cao

FOREIGN PATENT DOCUMENTS

| | | |
|---|---|---|
| WO | 2017/027651 A1 | 2/2017 |
| WO | 2017/218629 A1 | 12/2017 |
| WO | 2018/160510 A1 | 9/2018 |
| WO | 2019/190608 A1 | 10/2019 |
| WO | 2020/237247 A1 | 11/2020 |
| WO | 2022/016160 A1 | 1/2022 |

OTHER PUBLICATIONS

Howell; International Preliminary Report On Patentability issued in PCT/US2020/034602; mailed Apr. 27, 2022; four pages.

Tanigawa; PCT Art. 34 Amendment in PCT/US2020/034602 and Letter Indicating Differences Between Original Claims And New Pending Claims; dated Mar. 15, 2021; five pages.

Anis et al. "Medical cannabis for Gilles de la Tourette syndrome: An open-label prospective study" Behav Neurol; Mar. 2022; 2022: 5141773. doi: 10.1155/2022/5141773, 10 pages.

Baratta et al. "Cannabis for Medical Use: Analysis of Recent Clinical Trials in View of Current Legislation" Front Pharmacol; May 2022; 13: 888903, doi: 10.3389/fphar.2022.888903, 17 pages.

Bilbao & Spanagel "Medical cannabinoids: A pharmacology-based systematic review and meta-analysis for all relevant medical indications" BMC Med; Aug. 2022; 20(1): 259, doi: 10.1186/s12916-022-02459-1, 29 pages.

Evans et al. "A comparison of Sativex® and Aseco® for treatment of severe motor and vocal tics; a single case report" Ann Forensic Res Anal; Nov. 2016; 3(2): 1032, three pages.

Ganos et al. "Clinical practice patterns in tic disorders among Movement Disorder Society members" Tremor Other Hyperkinet Mov; Oct. 2021; 11: 43, doi: 10.5334/tohm.656, 12 pages.

Grotenhermen & Müller-Vahl "The therapeutic potential of cannabis and cannabinoids" Dtsch Arztebl Int; Jul. 2012; 109(29-30): 495-501.

Grotenhermen & Müller-Vahl "Two decades of the International Association for Cannabinoid Medicines: 20 Years of supporting research and activities toward the medicinal use of cannabis and cannabinoids" Cannabis Cannabinoid Res; Apr. 2021; 6(2): 82-87.

Jakubovski & Müller-Vahl "Speechlessness in Gilles de la Tourette syndrome: Cannabis-based medicines Improve severe vocal blocking tics in two patients" Int J Mol Sci; Aug. 2017; 18: 1739, doi: 10.3390/ijms18081739, six pages.

Jakubovski et al. "The CANNA-TICS study protocol: A randomized multi-center double-blind placebo controlled trial to demonstrate the efficacy and safety of nabiximols in the treatment of adults with chronic tic disorders" Front Psychiatry; Nov. 2020; 11: 575826, doi: 0.3389/fpsyt.2020.57582, ten pages.

Kluger et al. "The therapeutic potential of cannabinoids for movement disorders" Mov Disord; Mar. 2015 ePub Feb. 2015; 30(3): 313-327.

Lacroix et al. "What do we know about medical cannabis in neurological disorders and what are the next steps?" Front Pharmacol; Apr. 2022; 13: 883987, doi: 10.3389/fphar.2022.883987, ten pages.

Legare et al. "Therapeutic potential of cannabis, cannabidiol, and cannabinoid-based pharmaceuticals" Pharmacology; Mar. 2022 ePub Jan. 2022; 107(3-4): 131-149.

Lim et al. "A systematic review of the effectiveness of medical cannabis for psychiatric, movement and neurodegenerative disorders" Clin Psychopharmacol Neurosci; Nov. 2017; 15(4): 301-312.

Müller-Vahl et al. "Combined treatment of Tourette syndrome with Δ9-THC and dopamine receptor antagonists" J Cannabis Therap; Jun. 2002; 2(3-4): 143-152.

Namdar et al. "Chronological review and rational and future prospects of cannabis-based drug development" Molecules; Oct. 2020; 25(20): 4821, doi: 10.3390/molecules25204821, 13 pages.

Schwittay et al. "Tic reduction in adult onset Gilles de la Tourette syndrome using as required nabiximols spray" Tremor Other Hyperkinet Mov; Aug. 2021; 11(1): 33, doi: 10.5334/tohm.613, five pages.

Szejko et al. "Delta-9-tetrahydrocannabinol for the treatment of a child with Tourette syndrome: Case report" Eur J Med Case Rep; May 2018; 2(2): 39-41.

Szejko et al. "Vaporized cannabis is effective and well-tolerated in an adolescent with Tourette syndrome" Med Cannabis Cannabinoids; Jan. 2019; 2(1): 60-63.

Szejko et al. "Cannabis improves obsessive-compulsive disorder—Case report and review of the literature" Front Psychiatry; Jul. 2020; 11: 681, doi: 10.3389/fpsyt.2020.00681, eight pages.

Szejko et al. "Cannabis-based medicine in treatment of patients with Gilles de la Tourette syndrome" Neurol Neurochir Pol; 2022 ePub Oct. 2021; 56(1): 28-38.

Szejko & Müller-Vahl "Cannabinoids: Possible role in the pathophysiology and therapy of Gilles de la Tourette syndrome" in the Neurobiology of the Gilles De La Tourette Syndrome and Chronic Tics—Part B (Lavoie & Cavanna, eds.); Sep. 2022 ePub May 2022; 269-294.

Thaler et al. "Single center experience with medical cannabis in Gilles de la Tourette syndrome" Parkinsonism Relat Disord; Apr. 2019 ePub Oct. 2018; 61: 211-213.

Trainor et al. "Severe motor and vocal tics controlled with Sativex®" Australas Psychiatry; Aug. 2016; 24(6): 541-544.

Whiting et al. "Cannabinoids for medical use A systematic review and meta-analysis" JAMA; Jun. 2015; 313(24): 2456-2473.

Wong & Wilens "Medical cannabinoids in children and adolescents: A systematic review" Pediatrics; Nov. 2017; 140(5): e20171818, doi: 10.1542/peds.2017-1818, 16 pages.

International Search Report & Written Opinion issued in PCT/US2020/034602; mailed Aug. 27, 2020.

Abi-Jaoude et al. "Preliminary evidence on cannabis effectiveness and tolerability for adults with Tourette syndrome" J Neuropsychiatry Clin Neurosci; Fall 2017; 29(4): 391-400.

Curtis et al. "Cannabinoids for Tourette's syndrome" Cochrane Database Syst Rev; Oct. 2009; 2009(4): CD006565, 12 pages.

Kanaan et al. "Significant tic reduction in an otherwise treatment-resistant patient with Gilles de la Tourette syndrome following treatment with nabiximols" Brain Sci; Apr. 2017; 7: 47, six pages.

Khan et al. "The therapeutic role of cannabidiol in mental health: A systematic review" J Cannabis Res; Jan. 2020; 2 (1): 2, 21 pages.

Koppel "Cannabis in the treatment of dystonia, dyskenias, and tics" Neurotherapeutics; Oct. 2015; 12(4): 788-792.

Milosev et al. "Treatment of Gilles de la Tourette syndrome with cannabis-based medicine: Results from a retrospective analysis and online survey" Cannabis Cannabinoid Res; Dec. 2019; 4(4): 265-274.

Müller-Vahl et al. "Cannabinoids: Possible role in patho-physiology and therapy of Gilles de la Tourette syndrome" Acta Psychiatr Scand; Dec. 1998; 98(6): 502-506.

Müller-Vahl et al. "Influence of treatment of Tourette syndrome with Δ9-tetrahydrocannabinol (Δ9-THC) on neuropsychological performance" Pharmacopsychiatry; Jan. 2001; 34(1): 19-24.

Müller-Vahl et al. "Treatment of Tourette-syndrome with Δ9-tetrahydrocannabinol (THC): A randomized crossover trial" Pharmacopsychiatry; Mar. 2002; 35(2): 57-61.

Müller-Vahl et al. "Treatment of Tourette syndrome with delta-9-tetrahydrocannabinol (Δ9-THC): No influence on neuropsychological performance" Neuropsychopharmacology; Feb. 2003; 28(2): 384-388.

Müller-Vahl "Cannabinoids reduce symptoms of Tourette's syndrome" Expert Opin Pharmacother; Oct. 2003; 4 (10): 1717-1725.

Müller-Vahl "Treatment of Tourette syndrome with cannabinoids" Behav Neurol; 2013; 27(1): 119-124.

Müller-Vahl et al. "Cerebrospinal fluid endocannabinoid levels in Gilles de la Tourette syndrome" Neuropsycho-pharmacolgy; Jul. 2020; 45(8): 1323-1329.

Müller-Vahl et al. "Cerebrospinal fluid endocannabinoid levels in Gilles de la Tourette syndrome" Neuropsycho-pharmacology; Feb. 2003; 28(2): 384-388.

Seidman & Seidman "A review of the current treatment of Tourette syndrome" J Pediatr Pharmacol Ther; Jun. 2020; 25(5): 401-412.

(56) References Cited

OTHER PUBLICATIONS

Szejko et al. "Possible role of the endocannabinoid system in Tourette syndrome" Recent Advances in Cannabinoid Research (Costain & Laprairie, eds.); Nov. 2018; doi: 10.5772/intechopen.79895, 119-135.

The extended European search report issued by the European Patent Office on Jun. 12, 2023, which corresponds to European Patent Application No. 20809522.4-1112 and is related to U.S. Appl. No. 17/613,909.

Pichler et al., "Pure delta-9-tetrahydrocannabinol and its combination with cannabidiol in treatment-resistant Tourette syndrome: A case report", The International Journal of Psychiatry in Medicine, 54(2):150-156, Jul. 30, 2018, doi: 10.1177/0091217418791455.

Brzozowska et al., "The differential binding of antipsychotic drugs to the ABC transporter P-glycoprotein predicts cannabinoid-antipsychotic drug interactions" Neuropsychopharmacology; Oct. 2017; 42(11): 2222-2231.

Di Forti et al., "Proportion of patients in south London with first-episode psychosis attributable to use of high potency cannabis: A case-control study" Lancet Psychology; Mar. 2015 Epub Feb. 2015; 2(3): 233-238, doi: 10.1016/ S2215-0366(14)00117-5.

Serag et al., "Efficacy of cannabis-based medicine in the treatment of Tourette syndrome: A systematic review and meta-analysis" European Journal of Clinical Pharmacology; Oct. 2024; 80(10): 1483-1493.

Xiong et al., "Prevalence of Tourette syndrome among children and adolescents in the United States, 2016-2022" BMC Public Health; Oct. 2024; 24(1): 2699, doi: 10.1186/s12889-024-20216-2.

\* cited by examiner

COMPOSITIONS AND METHODS USING CANNABINOIDS FOR TREATING STAMMERING/STUTTERING AND SYMPTOMS OF TOURETTE SYNDROME

SUMMARY

This invention relates to compositions and methods for treating stammering/stuttering and Tourette syndrome (TS) in humans, using a formulation comprising of a combination of a *Cannabis* compound, or compounds.

BACKGROUND

Stuttering is a common speech disorder in persons of all ages that can be a basis for disturbances in the normal fluency and time patterning of speech. Recent evidence indicates that the disorder origin may be a result of inborn central nervous system abnormalities that interrupt fluent speech (Costa D and Kroll R, Review Shuttering: an update for physicians. CMAJ. 2000 Jun. 27; 162(13): 1849-1855). Persistent stuttering is a fluency disorder that occurs during early childhood without obvious reasons and persists in ~1% of the adult population, predominantly in males (Yairi E and Ambrose N J, Review Epidemiology of stuttering: 21st century advances Fluency Disord. 2013 June; 38(2): 66-87).

Tourette syndrome (TS) is a childhood onset, neurobehavioral disorder and characterized by motor and vocal tics, and associated with a wide spectrum of behavioral and cognitive alterations. The prevalence of developing TS is four times higher in males than the female counterparts (Yairi E, Ambrose N G, Paden E P, Throneburg R N Predictive factors of persistence and recovery: pathways of childhood stuttering. J Commun Disord. 1996 January-February; 29(1): 51-77). TS is a chronic, neuro-psychiatric disorder and associated with the combination of multiple motor tics and at least one vocal tic. Most patients suffer from psychiatric comorbidities such as attention deficit hyperactivity disorder (ADHD), obsessive compulsive disorder (OCD), self-injurious behavior, depression, and anxiety disorder. An estimated prevalence of TS is about 1% and more affected in males than females (Robertson, M. M.; Eapen, V.; Cavanna, A. E. The international prevalence, epidemiology, and clinical phenomenology of Tourette syndrome: A cross-cultural perspective. J. Psychosom. Res. 2009, 67: 475-483; Knight, T.; Steeves, T.; Day, L.; Lowerison, M.; Jette, N.; Pringsheim, T. Prevalence of tic disorders: A systematic review and meta-analysis. Pediatr. Neurol. 2012, 47: 77-90). More adversely affected patients usually display more complex tics including imitating gestures (echopraxia) and words or phrases (echolalia), and paliphenomena such as phonic blocking and repetition of own words and syllables (palilalia) (New Insights into Clinical Characteristics of Gilles de la Tourette Syndrome: Findings in 1032 Patients from a Single German Center. Sambrani T, Jakubovski E, Müller-Vahl K R Front Neurosci. 2016; 10: 415). The palilalia and vocal blocking highly affect the fluency of speech and look like the phenomenon of stuttering, leading to significant social problems (Ganos C., Müller-Vahl K., Bhatia K. P. Blocking phenomena in Gilles de la Tourette syndrome. Mov. Disord. Clin. Pract. 2015, 2: 438-439). The clinical features of TS resemble speech pathological symptoms such as stuttering and cluttering, however pathophysiology associated with both conditions are different from one another in terms of diagnosis and treatment (Dysfluency and phonic tics in Tourette syndrome: a case report. Van Borsel J, Vanryckeghem M J Commun Disord. 2000 May-June; 33(3): 227-239; quiz 239-40).

There is no common agreement on the pathophysiology of stuttering. Several research studies have indicated that alterations in sensory, motor, and cognitive functions, however the basis of pathophysiology has produced inconsistent or nonreproducible results. One reliable finding reported abnormal auditory feedback systems in persons who stutter. (PWS) (Andrews G, Craig A, Feyer A M, Hoddinott S, Howie P, Neilson M; Review Stuttering: a review of research findings and theories circa 1982. J Speech Hear Disord. 1983 August; 48(3): 226-246).

Several neurotransmitter systems have been indicated to be associated with the pathogenesis of TS including the dopaminergic, serotonergic, glutamatergic, gamma-amino butyric acid-(GABA)ergic, histaminergic, and endocannabinoid systems (Martino, D. and Leckman, J. F. *Tourette Syndrome*. Oxford University Press, New York; 2013). The multiple evidences, however, supports a "dopaminergic hypothesis" in TS with an increased signal transduction in brain. This hypothesis is supported by the effects of dopamine receptor blocking drugs (antipsychotics) on tics (Roessner, V., Plessen, K. J., Rothenberger, A., Ludolph, A. G., Rizzo, R., Skov, L., Strand, G., Stern, J. S., Termine, C., and Hoekstra, P. J. European clinical guidelines for Tourette syndrome and other tic disorders. Part II: Pharmacological treatment. Eur. Child. Adolesc. Psychiatry. 2011; 20(4): 173-196), other findings include alterations in both presynaptic dopamine transporters (DAT) and postsynaptic dopamine D2 receptors (DRD2) in striatal and extra-striatal regions based on the detection of increased presynaptic dopamine uptake sites in both the striatum and the frontal cortex (Singer, H. S., Hahn, I. H., and Moran, T. H. Abnormal dopamine uptake sites in postmortem striatum from patients with Tourette's syndrome. Ann. Neurol. 1991; 30(4): 558-562; Minzer, K., Lee, O., Hong, J. J., and Singer, H. S. Increased prefrontal D2 protein in Tourette syndrome: a postmortem analysis of frontal cortex and striatum. J. Neurol. Sci. 2004; 219(1-2): 55-61). Several studies have revealed that alterations in dopaminergic system with increased striatal DAT binding as well as dopamine transporter binding in Gilles de la Tourette syndrome using a [123I]FP-CIT/SPECT study (Serra-Mestres, J., Ring, H. A., Costa, D. C., Gacinovic, S., Walker, Z., Lees, A. J., Robertson, M. M., and Trimble, M. R. Dopamine transporter binding in Gilles de la Tourette syndrome: A [$^{123}$I]FP-CIT/SPECT study. Acta Psychiatr. Scand. 2004; 109(2): 140-146).

One study showed, based on positron emission tomography (PET) scans that a dysregulation of the dopamine system and increased dopaminergic activity is persistent in developmental stuttering. (Wu J C, Maguire G, Riley G, Lee A, Keator D, Tang C, Fallon J, Najafi A. Increased dopamine activity associated with stuttering. Neuroreport. 1997 Feb. 10; 8(3): 767-770). Further, an additional study supports the theory that the hyperdopaminergic system may be involved in developmental shuttering wherein levodopa, is converted into dopamine, worsening speech fluency (Anderson J M, Hughes J D, Rothi L J, Crucian G P, Heilman K M. Developmental stuttering and Parkinson's disease: the effects of levodopa treatment. J Neurol Neurosurg Psychiatry. 1999 June; 66(6): 776-778). Further in support of this notion, dopamine antagonists, such as haloperidol, risperidone or olanzapine, typically improve speech fluency (Lavid N, Franklin D L, Maguire G A Management of child and adolescent stuttering with olanzapine: three case reports.

Ann Clin Psychiatry. 1999 December; 11(4): 233-236; Maguire G A, Yu B P, Franklin D L, Riley G D Review alleviating stuttering with pharmacological interventions. Expert Opin Pharmacother. 2004 July; 5(7): 1565-1571). However, the use of antipsychotics drugs for the treatment of stuttering is currently under discussion because of unwanted adverse side effects (Bothe A K, Franic D M, Ingham R J, Davidow J H.

Pharmacological approaches to stuttering treatment: reply to Meline and Harn (2008) Am J Speech Lang Pathol. 2008, 17(1): 98-101; Boyd A, Dworzynski K, Howell P. Review Pharmacological agents for developmental stuttering in children and adolescents: a systematic review. J Clin Psychopharmacol. 2011 December; 31(6): 740-744; Maguire G A, Yu B P, Franklin D L, Riley G D. Alleviating stuttering with pharmacological interventions. Expert Opin Pharmacother. 2004 July; 5(7): 1565-1571). The stuttering-like dysfluencies also involve both increased and decreased dopamine levels (Goberman A M, Blomgren M. Parkinsonian speech disfluencies: effects of L-dopa-related fluctuations. J Fluency Disord. 2003 Spring; 28(1): 55-70).

Atypical antipsychotics such as risperidone, ziprasidone, quetiapine, clozapine, tiapride, sulpiride, and aripiprazole drugs are known to reduce dopaminergic signaling as well as far less likely to cause extrapyramidal side effects. Several clinical cases have shown that risperidone, and aripiprazole seem to be the most robust evidence-based options for the treatment of stammering. Where as quetiapine may be a promising therapy. However, ziprasidone and olanzapine are also effective, but the evidence is lacking. In terms of tic symptom score, compared with placebo, haloperidol, risperidone, aripiprazole, quetiapine, olanzapine, and ziprasidone can significantly improve tic symptom score (Chunsong Yang, Zilong Hao, Ling-Li Zhang, Cai-Rong Zhu, Ping Zhu, Qin Guo, Comparative Efficacy and Safety of Antipsychotic Drugs for Tic Disorders: A Systematic Review and Bayesian Network Meta-Analysis, Pharmacopsychiatry 2019; 52(1): 7-15).

The most common adverse events of haloperidol were drowsiness, extrapyramidal reactions, and dry mouth. The most common adverse events of tiapride and aripiprazole were dizziness, nausea, and dry mouth. Where as, risperidone also induce adverse events such as drowsiness and appetite (Chunsong Yang, Zilong Hao, Ling-Li Zhang, Cai-Rong Zhu, Ping Zhu, Qin Guo, Comparative Efficacy and Safety of Antipsychotic Drugs for Tic Disorders: A Systematic Review and Bayesian Network Meta-Analysis, Pharmacopsychiatry 2019; 52(1): 7-15).

The traditional treatment includes behavioral therapy and antipsychotic medication, which are known to induce significant side effects and with limited effectiveness in a substantial number of patients with TS (European clinical guidelines for Tourette syndrome and other tic disorders. Part III: behavioural and psychosocial interventions. Verdellen C, van de Griendt J, Hartmann A, Murphy T, ESSTS Guidelines Group. Eur Child Adolesc Psychiatry. 2011 April; 20(4): 197-207). There is an urgent need for treating stammering with new and more effective treatment with fewer side effects.

The central endocannabinoid system (ECS) has been proposed as an alternative mechanism of drug action (Müller-Vahl, K. R.; Kolbe, H.; Schneider, U.; Emrich, H. M. Cannabinoids: Possible role in patho-physiology and therapy of Gilles de la Tourette syndrome. Acta Psychiatr. Scand. 1998, 98(6): 502-506). Accordingly, *Cannabis*-based medicine (CBM) such as dronabinol (delta-9-tetrahydrocannabinol, THC) and nabiximols which contains THC and cannabidiol (CBD) at a 1:1 ratio—have been suggested as new treatment strategies for patients with TS. A recent case study indicates that with a daily high dosage of delta-9-tetrahydrocannabinol (10 mg) combined with cannabidiol (CBD) (20 mg), the patient showed a rapid and highly significant improvement in the Yale Global Tic Severity Scale (Pichler E M, Kawohl W, Seifritz E, Roser P. Pure delta-9-tetrahydrocannabinol and its combination with cannabidiol in treatment-resistant Tourette syndrome: A case report. Int J Psychiatry Med. 2018 Jul. 30:91217418791455). In few clinical study cases in children with age between 16 and 19 have reported that very high doses of synthetic THC or *Cannabis* found to result in be a significant improvement in symptoms such as vocal blocking tics as well as of comorbid conditions (Ewgeni Jakubovski and Kirsten Müller-Vahl. Speechlessness in Gilles de la Tourette Syndrome: *Cannabis*-Based Medicines Improve Severe Vocal Blocking Tics in Two Patients Int. J. Mol. Sci. 2017, 18(8): 1739; doi:10.3390/ijms18081739). However, the high doses of *Cannabis* are associated with side effects.

SUMMARY

This invention provides compositions and methods for treating patients suffering from stammering, stuttering or Tourette syndrome which includes administering to such a patient THC in the range of about 0.2 µg/kg to about 0.035 mg/kg of a patient and/or CBD in the range of about 0.2 µg/kg to about 0.035 mg/kg of a patient. The composition may be in the form of oral drops or an oral spray.

In preferred embodiments, THC can be organic or synthetic and combined with atypical antipsychotic drugs such as risperidone, tiapride, sulpiride, and aripiprazole can be used with THC and/or CBD.

DESCRIPTION

*Cannabis* compounds can be synthetic (chemically synthesized) or extracted from *Cannabis* plants such as sativa, indica, or hemp or hybrid strains of sativa and indica. A preferred source of tetrahydrocannabinol (THC) is so-called organic THC, which is extracted from *Cannabis* and contains minor amounts of other cannabinoids such as CBD.

The preferred oral dose range comprising the formulation is set out in Table 1:

TABLE 1

| Active ingredient | Dose range per kg of body weight |
|---|---|
| THC | 0.2 µg/kg to about 0.035 mg/kg |
| CBD | 0.2 µg/kg to about 0.035 mg/kg |

TABLE 2

| Conversion of dose for a 70-kg human: | |
|---|---|
| Active ingredient | Dose range per 70 kg of body weight |
| THC | 1.4 µg to about 2.5 mg |
| CBD | 1.4 µg to about 2.5 mg |

The preferred oral dose is in the range of 1 ml of an oral suspension, for a 70-Kg human, twice a day, thrice a day or four times a day depending on the severity of the symptoms comprising of a *Cannabis* compound with up to 2.5 mg of THC, and up to 2.5 mg CBD.

The combination of lower dose of THC and CBD, compounds unexpectedly lead to a lower incidence of stammering and symptoms associated with TS.

Suitable pharmaceutically acceptable *Cannabis* compounds include *Cannabis* extract, which includes phytocannabinoids such as tetrahydrocannabinol "THC" (9-tetrahydrocannabinol (delta-9 THC), 8-tetrahydrocannabinol (delta-8 THC) and 9-THC acid), cannabidiol (CBD), other phytocannabinoids such as cannabinol (CBN), cannabichromene (CBC), cannabigerol (CBG) among others, terpenoids, and flavonoids. Standardized *Cannabis* extract (SCE) consists of mostly THC, CBD, and CBN. Organic THC consists of solvent extracted THC from *Cannabis* with lesser or trace amounts of other cannabinoids and terpenoids. Synthetic or pure THC, which is free of CBD and other compounds, is a preferred *Cannabis* compound.

THC and CBD can be extracted from a *Cannabis* indica dominant strain using, for example, high pressure and carbon dioxide or ethanol as a solvent in a 1500-20L subcritical/supercritical $CO_2$ system made by Apeks Supercritical, 14381 Blamer Rd., Johnstown, Ohio, 43031.

Example 1

The following is a list of ingredients for making 30 ml of the formulation:
I. THC: 0.25%
II. CBD: 0.25%
III. Honey (organic): 20% ml
IV. Vitamin-E-TPGS: 2.5%
V. Rutin: 0.05%
VI. Coconut oil (organic): 0.5%
VII. USP Water: 80%
VIII. Ascorbic acid 1%
IX. Organic flavor: 0.05%
X. Beta-cyclodextrin: 0.5%

Weigh 75 mg of each compound THC and CBD and dissolve in 150 mg of coconut oil using a mechanical stirrer for 6 minutes. To this add 150 mg of beta cyclodextrin and 0.750 g of Vitamin-E-TPGS and mix with a mechanical stirrer for 6 minutes. Label this solution as Solution A.

In a separate beaker, weigh 0.3 g of ascorbic acid and add 24 ml of USP grade water and 6 ml honey. Stir this mixture using a mechanical stirrer for 10 minutes. Label this as Solution B.

To Solution B, add 1.6 mg of Rutin and mechanically stir for 7 minutes.

Filter Solution B through a 0.2-micron filter using a vacuum filtration unit.

Mix Solution A and the Filtered Solution B together and mechanically stir for 15 minutes.

The final solution is stored in a bottle away from direct sunlight at room temperature.

The *Cannabis* or hemp plant in its natural form contains THCA and CBDA. The resin called shatter is extracted from the *Cannabis*/hemp flower using any of a variety of methods including $CO_2$ extraction as described herein. Shatter is produced using a three-step process: kief separation, extraction, and winterization. *Cannabis* flower is introduced into a steel tumbler over a mesh sieve with dry ice. Flower is frozen and broken while tumbled with dry ice chunks allowing fine THCA bearing particles (kief) to fall through the sieve. THCA is then extracted from kief using supercritical extraction. A solvent such as $CO_2$ and kief are introduced into a chamber. That sealed chamber is pressurized to approximately 2800 psi and heated to 53° C. Supercritical $CO_2$ is then allowed to flow out of the pressurized chamber into a vial at room temperature and pressure (while more $CO_2$ is introduced to maintain pressure in the chamber). As the $CO_2$ vaporizes in the collector vial, it deposits shatter. In the third, optional step, called winterization, the $CO_2$ oil is dissolved in ethanol (¾ ounce shatter dissolved in 400 ml ethanol). This mixture is then poured through a filter (such as a coffee filter) frozen for 48 hours, then warmed, filtered again, and then spun with heat to evaporate off the ethanol. The remaining resin contains a combination of THCA, CBDA, and other *Cannabis* compounds. The resin is heated for 60 minutes at 240° F. An HPLC test is run to determine the amount of THC and CBD and THCA and CBDA present in the resin.

75 mg of the resin containing 99% THC and CBD (as determined by HPLC) is dissolved in 150 mg of organic coconut oil. The dissolved resin is transferred and mixed with the solution of -honey-ascorbic acid-rutin-vitamin-E-TPGS. The solution is filtered and sterilized using a 0.2-micron PES Nalgene filtration unit under constant pressure in a sterilized environment. The filtered 30 ml solution is transferred to and stored in an amber glass bottle that is autoclaved in an aseptic condition.

Example 2

A TS patient exhibiting multiple motor and vocal tics an hour is given 1 ml of the formulation of Example 1, in the morning on an empty stomach, prior to breakfast, and 1 ml prior to dinner in the evening. The patient after three days of therapy exhibits reduced motor and vocal tics with no side effects commonly associated with *Cannabis*.

Example 3

A stuttering patient exhibiting continuous conversational stuttering is given 1 ml of the formulation of Example 1, in the morning on an empty stomach, prior to breakfast, and 1 ml prior to dinner in the evening. The patient exhibits reduced vocal stuttering.

Example 4

A patient exhibiting conversational stuttering during stress is given 1 ml of the formulation of Example 1 via a spray prior to the onset of stress. The patient exhibits reduced vocal stuttering and manages to have a near stuttering free conversation.

Example 5

A patient with advance stage TS exhibiting moderate to severe anxiety, sleep disorder and/or multiple motor tics and several vocal (phonic) conversational stuttering is given 1 ml of the formulation of Example 1 three times a day, morning afternoon and evening, prior to meals. The patient exhibits reduced anxiety and agitation and caregiver distress.

Example 6

The formulation of Example 1, without the THC component, is administered three times a day prior to meals to a moderate stage attention deficit hyperactivity disorder (ADHD), obsessive compulsive disorder (OCD), self-injurious behavior, depression, and anxiety disorder with a decrease in all symptoms.

Example 7

A male patient displaying stammering and taking standard atypical anti-psychotic drug treatment. The said patient is administered the formulation of Example 1 without the CBD component which over three days leads to a decrease in the anti-psychotic medication and associated side effects of the atypical anti-psychotic drug medication.

Example 8

A patient displaying stammering and taking standard atypical anti-psychotic drug is administered the formulation of Example 1 without the THC component. Over three days the patient exhibits a decrease in the atypical anti-psychotic drug medication and associated side effects of the antipsychotic drug medication.

Example 9

A male patient age 17 displaying stammering and on standard atypical anti-psychotic drug is administered the formulation of Example 1 without THC. The patient, after 5 days of treatment, exhibits a decrease in the atypical antipsychotic medication and associated side effects of the anti-psychotic drug medication.

Example 10

A male patient age 14 displays stammering as measured on the Speech Efficiency Score (SES) scale of 11. The patient is administered the formulation of Example 1 without the THC component. After a period of two weeks the patient exhibits an SES score of 6.

The invention claimed is:

1. A method for treating a patient suffering from stammering, stuttering, or Tourette syndrome comprising administering to said patient a composition comprising (a) an atypical antipsychotic drug; and (b) tetrahydrocannabinol (THC) in the range of 0.2 µg/kg to 0.035 mg/kg patient weight, or cannabidiol (CBD) in the range of 0.2 µg/kg to 0.035 mg/kg patient weight, or both the THC and the CBD each in the range of 0.2 µg/kg to 0.035 mg/kg patient weight.

2. A method according to claim 1 wherein said patient is orally administered the THC in a daily dose of up to 2.5 mg.

3. A method according to claim 1 wherein said patient is orally administered the CBD in a daily dose of up to 2.5 mg.

4. A method according to claim 1 wherein the atypical antipsychotic drug is clozapine.

5. A method according to claim 1 wherein the THC is organic.

6. A method according to claim 1 wherein the THC is synthetic.

7. A method according to claim 1 wherein the atypical antipsychotic drug is selected from the group consisting of risperidone, clozapine, olanzapine, ziprasidone, tiapride, sulpiride, and aripiprazole in an amount that lowers the incidence of stammering.

8. A method according to claim 7 wherein said patient is administered the THC in a daily dose of up to 2.5 mg, the CBD in a daily dose of up to 2.5 mg, and the atypical antipsychotic drug is selected from the group consisting of risperidone, tiapride, sulpiride, and aripiprazole.

9. A method according to claim 8 wherein said composition is orally administered.

10. A method according to claim 9 wherein said composition is in the form of oral drops or an oral spray.

11. A method according to claim 8 wherein the THC is organic.

12. A method according to claim 8 wherein the THC is synthetic.

13. A method for treating a 70 kg human patient suffering from stammering, stuttering, or Tourette syndrome comprising administering to said patient a composition comprising (a) a dissolved resin extracted from *Cannabis* or hemp flowers, (b) an atypical antipsychotic drug, and (c) water; the resin containing (i) tetrahydrocannabinols (THC) in the range of 14 µg to 2.5 mg, or (ii) cannabidiols (CBD) in the range of 14 µg to 2.5 mg, or both the THC and the CBD each in the range of about 14 µg to 2.5 mg.

14. A method according to claim 13 wherein said composition comprises both the THC and the CBD.

15. A method according to claim 14 wherein the THC and/or the CBD are at least 99% of cannabinoid compounds in the resin.

16. A method according to claim 15 wherein the THC is organic.

17. A method according to claim 13 wherein the atypical antipsychotic drug is selected from the group consisting of risperidone, clozapine, olanzapine, ziprasidone, tiapride, sulpiride, and aripiprazole in an amount that lowers the incidence of stammering.

18. A method according to claim 17 wherein said composition comprises both the THC and the CBD, and the atypical antipsychotic drug is selected from the group consisting of risperidone, tiapride, sulpiride, and aripiprazole.

19. A method according to claim 13 wherein the atypical antipsychotic drug is clozapine.

20. A method according to claim 13 wherein said composition is administered in the form of oral drops or an oral spray.

* * * * *